May 19, 1925.
C. H. MUELLER
1,538,052
TRAILER
Filed Jan. 23, 1922
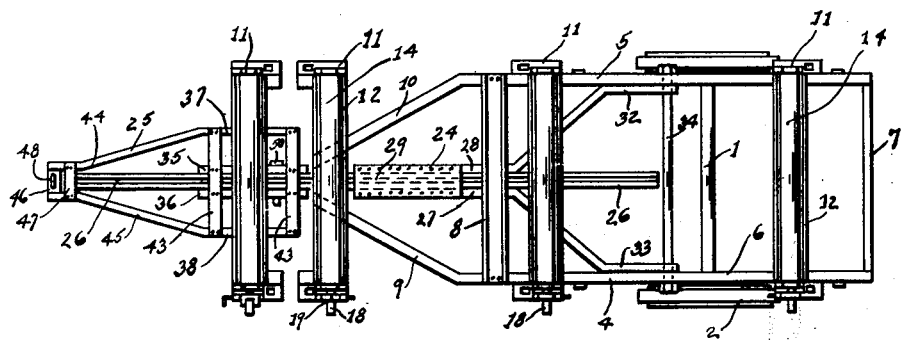
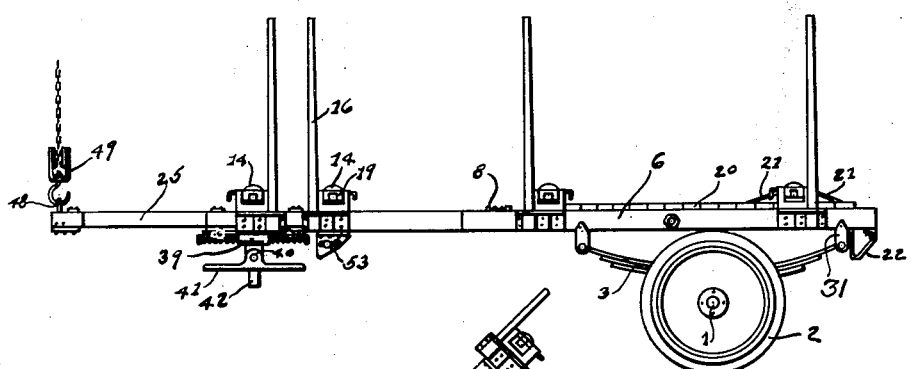
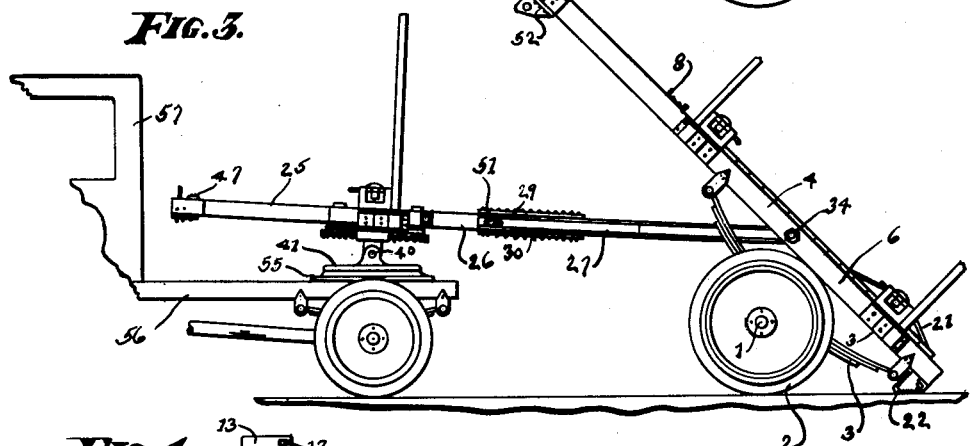
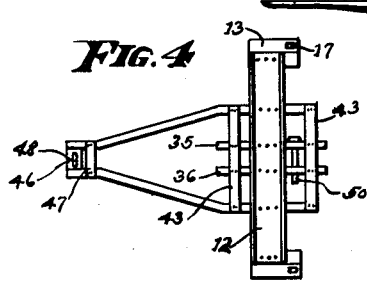
Charles H. Mueller INVENTOR.
BY
Erwin, Wheeler & Woolard
ATTORNEYS.

Patented May 19, 1925.

1,538,052

UNITED STATES PATENT OFFICE.

CHARLES H. MUELLER, OF MILWAUKEE, WISCONSIN.

TRAILER.

Application filed January 23, 1922. Serial No. 531,293.

*To all whom it may concern:*

Be it known that I, CHARLES H. MUELLER, a citizen of the United States, residing at Milwaukee, county of Milwaukee, and State of Wisconsin, have invented new and useful Improvements in Trailers, of which the following is a specification.

This invention relates to improvements in that class of road vehicles known as trailers. More particularly this invention relates to a type of trailer designed for attachment to a motorized towing unit and peculiarly adapted for the transportation of lumber.

It is an object of this invention to provide a trailer adapted to carry lumber and similar loads of varying lengths, the design and arrangement of the apparatus being such as to avoid overloading the trailer axle. The trailer herein described is so designed that its axle will at no time be required to support more than one half of the total weight of the load.

In lumber carrying devices hitherto used, the construction has generally been such as to impose a terrific strain upon the vehicle at the moment of discharge of the load. Whatever arrangements have been for providing an adjustable reach for the purpose of distributing the weight of the load properly upon the vehicle for transportation, there has not, so far as I am aware, ever been a vehicle designed to discharge a load of lumber without subjecting the extreme rear end of the vehicle to the entire crushing weight of the load at the moment of discharge. The rear end of the vehicle ordinarily projects beyond the axle upon which the vehicle is supported and a considerable turning moment is thus developed tending to cause the vehicle to rotate about its axle. Springs have frequently been broken and the breakage of spring shackles has been particularly high in the use of prior art devices for lumber transportation. It is believed that almost all of this breakage can be traced to the unusual demands made upon the springs and shackles at the moment of unloading.

The present invention deals with a type of trailer, the body of which is adapted to yield to the turning moment placed thereon by the load, at the time of discharge, in such a way that the body will at all times conform in angle to the angle at which the load is disposed, and the weight of the load will consequently be borne by the spring in a substantially normal manner until the load is at the point of leaving the vehicle altogether. At this stage other means of support are provided so that the rear spring shackles will at no time be subjected to excessive strains.

It is also an object of this invention to provide a trailer having an unusual range of adjustment in the reach, whereby the weight of loads of any length may adequately be distributed and sustained in substantially equal proportions by the various portions of the vehicle during the time necessary for the transportation of the load. It is also desired to provide a trailer susceptible of an unusual degree of longitudinal adjustment, in which rollers are provided to facilitate the handling of lumber, and are so disposed as to be serviceable in all degrees of adjustment of the trailer body. In the present invention it is the body of the trailer itself which is adjustable. The adjustment does not merely consist of lengthening the distance between the trailer axle and that of the power unit, by which the forward portion of the frame is supported. It will be brought out hereinafter that the portion of the trailer which is attached to the truck or power unit is actually intended and adapted to carry its share of the load. The fact that it in turn is sustained by the truck to which it is attached does not render it any less a part of the body of the frame.

In the drawings:

Figure 1 is a plan view of a trailer embodying this invention, the flooring or deck being omitted from the trailer frame.

Figure 2 is a side elevation of a trailer embodying this invention as it appears with its forward end suspended in a position to receive the power unit.

Figure 3 is a side elevation of the same device attached to the power unit, the rear portion of the trailer body being shown in load-discharging position.

Figure 4 is a detail of that portion of the mechanism which is mounted upon the power unit or truck.

Like parts are identified by the same reference characters throughout the several views.

The device in reality is made up of two distinct frames, one of which is supported by the trailer axle and wheels and overlaps considerably a portion of the other frame. The second frame is pivoted to an intermediate portion of the first mentioned frame, preferably at a point immediately forward of the axle and extends thence forwardly to a point where it may conveniently be supported upon the power unit. The adjustable feature is found wholly in the second mentioned frame.

The trailer unit is provided with an axle 1 and set of wheels 2 of ordinary construction. Springs 3 are supported from the axle in the usual manner and are shackled at their ends to the side members 4 and 5 of the tilting frame 6 of the trailer. The tilting frame includes, in addition to the longitudinally disposed side members 4 and 5 above referred to, transverse members 7 and 8, and converging members 9 and 10. These last named members are located at the forward end of this frame and are maintained with their ends in a fixed, spaced relation by a roller carrying bracket, designated in its entirety by the numeral 11.

Other roller carrying brackets 11, similar to that which maintains the converging members 9 and 10 in properly spaced positions, are located at suitable points upon the frame 6. Each of these brackets is so made as to constitute a frame re-enforcing structure and to add materially to the rigidity of the device as a whole. Each bracket includes a channel iron member 12, the main flange of which may be riveted or bolted to the frame. At the ends of the section of channel iron are blocks 13 which serve the dual purpose of providing bearing supports for the rollers 14 and of supporting the stakes 16. The stakes are received in the usual way by the recesses 17 with which each block 13 is preferably provided. The shafts 18 upon which the rollers are mounted are preferably squared at one or both ends to facilitate the manual rotation of each roller by means of a detachable hand crank. This practice, however, is common in devices intended for the transportation of lumber. It is likewise usual to provide a latching device 19 engageable with the squared end of the roller shaft 18 to prevent the accidental rotation thereof.

It will be obvious that the channel iron member 12, which constitutes the principal element in the roller carrying bracket 11, will serve admirably to maintain the converging members 9 and 10 in suitably spaced relation.

The rear portion of the tilting frame 6 may be floored, if desired, as indicated at 20 in Figure 2. It is preferred that flooring be provided at this point, and in addition that metal plates 21 be disposed in the manner shown at the front and rear of that roller which is located adjacent the rear end of frame 6. These plates may be supported upon the upturned flanges of the channel iron member 12.

Preferably, the extreme rear portion of the tilting frame 6 is provided upon its lower side with a set of shoes 22, constructed substantially in the manner indicated in Figures 2 and 3. These shoes support the end of the tilting frame 6 by contacting directly with the ground when said frame is in its lumber-discharging position. The spring shackles 3' are afforded protection by a shoe disposed at this point.

As has previously been indicated, this invention contemplates the use of a second frame which is adapted to co-operate with frame 6, described above, and which is adjustable in length. The second frame is made up of two frame units, designated respectively in their entirety, by the numerals 24 and 25, these units being connected by a reach 26. The unit 24 is preferably constructed in the manner best illustrated in Figure 1. It includes a pair of longitudinally disposed members 27 and 28 which are secured together by upper and lower plates 29 and 30, respectively, thereby forming a box adapted to embrace closely the reach 26. It will be noted that members 27 and 28 bear for some distance upon the sides of the reach, thereby providing an adequate guide therefor. The members 27 and 28 thence diverge rearwardly and terminate in the horizontal members 32 and 33 which are preferably immediately adjacent to the respective side members of the frame 6. An axis shaft or pivot pin 34 is disposed transversely across the tiltable frame 6 and serves to connect pivotally the frame 24 to frame 6.

The unit 25 of the second frame includes a set of inner parallel members 35 and 36 which are similar to the members 27 and 28 in that they provide guides for the reach 26. A second and outer set of parallel members 37 and 38 are also provided. All of these members are preferably attached to a bolster 39 pivoted at 40 to a fifth wheel 41 which carries an integral king pin 42. The transverse frame members 43 strengthen the construction of the frame unit 25, as does also the roller bracket 11. It will be understood that the parallel members 35 and 36 confine the reach 26 against lateral movement, whereas the transverse members 43, the bolster 39, and the roller bracket 11 confine the reach against vertical movement.

The outer parallel members 37 and 38 are provided with forwardly converging portions 44 and 45 which are united at their forward ends by a block 46 which may be re-enforced by a plate 47, if desired. A U-bolt 48 in the block 46 serves as means for the attachment of the block and tackle mechanism, indicated at 49 in Figure 2, by which the forward end of the trailer may be supported pending attachment of a towing or power unit thereto.

The reach may be of any desired construction, but it is preferred that this element be designed to withstand a considerable degree of strain. To this end, the reach has been illustrated as comprising a pair of channel irons, brought together with their opposing flanges in substantial registry to form a box within which a wooden filler has been interposed.

The reach must necessarily be made adjustable through the units 24 and 25 of the frame, of which the reach constitutes the back bone. To this end it is preferably provided with a series of transverse apertures, any one of which is adapted to receive the bolts 50 and 51 which pass respectively through the reach-enclosing portions of frame unit 25 and frame unit 24. It will be noted that in the drawings the trailer is illustrated in its position of minimum expansion. The reach 26 extends from the nose plate 47 back to the pivot pin 34 by which the two frames of the trailer are secured together. When it is desired to enlarge the capacity of the trailer for the purpose of handling lumber of greater length, the reach will be moved axially, relative to the frame unit 25, as far to the rear as may be necessary, or, until the forward end of the reach registers with the forward ends of the parallel members 35 and 36. The change is accomplished by withdrawing temporarily the pin 50 and replacing it through the suitable opening in the reach.

If further extension is desired, the pin 51 will be withdrawn and the reach 26 will be moved axially forwardly, relative to the frame unit 24 to the desired distance, or, until the rear end of the reach comes into registry with the parallel guide members 27 and 28. The minimum possible distance between the forward roller bracket 11 and the roller bracket 11 at the rear of the trailer is 12 feet. In the device embodying this invention, which has actually been constructed and from which the drawings herewith were made. The maximum distance between the two roller brackets above referred to is 36 feet. It will be apparent, therefore, that the maximum capacity of the trailer embodying this invention is three times its minimum capacity. The wide variation is considered to be extremely important.

It will be noted that the tiltable frame 6 of the trailer is provided at its forward end with a pair of depending arms 52, apertured to receive a bolt 53 which may be inserted beneath the reach 26 to lock frame 6 against an accidental tilting movement. The bolt 53 may readily be removed, when desired, for the purpose of releasing the frame 6 and allowing it to tilt in the manner hereinafter to be described. When the frame 6 is in its normal horizontal position, the reach 26 will be embraced in the notched forward portion of the trailer frame between the adjacent ends of the converging members 9 and 10, which serve as a guide for the reach and permit the trailer as a whole to be guided readily and without excessive strains upon the pivot pin 34. The weight of the forward end of the tilting frame 6, and of any load which may be carried thereby, will be transmitted through the roller brackets 11 and the transverse frame members 8 to the reach. When the frame 6 is thus positioned, the construction is such that the trailer is as rigid as though the frames were integral.

The fifth wheel 41 is adapted to register with a bed plate 55 which may be recessed at its center to receive the king-pin 42. The plate 55 is mounted upon the platform at the rear of a truck 56 of ordinary construction. Preferably it will be so mounted that the weight of the load will be carried directly above the rear axle.

It will be noted that the truck here shown is provided with a cab 57. Where trucks of this type are used, it is possible to use the nose plate 47 as a guide for the loading of lumber. The relation of this plate to the cap 57 is such that a load of full width, extending forwardly as far as the plate 47, will adequately clear the cab 57 when the load pivots about the king-pin 42 in turning a corner.

The operation of this device is as follows. The trailer will first be adjusted to conform to the load which it is desired to mount thereon. If twelve-foot sticks are to be carried, the trailer will be set in the manner in which it appears in the accompanying drawings. The roller 14, which is carried by the forward end of the tilting frame 6, will then be immediately adjacent the similar roller which is carried by the frame unit 25. If shorter sticks are to be carried, the trailer may be lengthened. If, for example, the lumber to be transported is in ten-foot lengths, the trailer will be lengthened sufficiently so that its longitudinal capacity will be twenty feet. The two rollers 14, which are shown in the drawings to be immediately adjacent at the forward end of the trailer, will then be sufficiently removed from one another to give adequate support to one pile of ten-foot lengths of lumber. The remaining two rollers shown in the drawings are already accurately positioned to support an additional pile of ten-foot lengths. It will be apparent that whether the load is divided into two piles or one, its weight is evenly divided upon the rear axle of the truck 56 and the axle 1 of the trailer.

The trailer having been adjusted to receive the load, it is attached preferably to a towing unit especially adapted for use in the yards. This unit may comprise an ordinary horse-drawn vehicle provided with a table 55 at its rear end. It is desirable to use an inexpensive power unit while in the yards, for the reason that loading operation is apt to consume considerable time and the overhead which would be incurred if expensive trucks were allowed thus to remain idle would be needlessly great. The trailer is, therefore, attached to some inexpensive power unit and is drawn about the yards to receive its load. The locking devices 19 will be engaged with the squared roller axles 18 to secure the rollers against rotation, and thus to prevent the accidental discharge of the load.

When the loading operation is complete, the trailer is driven beneath a block and tackle device, indicated at 49, which is engaged with the U-bolt 48 and utilized to lift the trailer clear of the inexpensive power unit used for loading. The truck 56 will then be backed beneath the free end of the trailer which will be lowered until the kingpin 42 is firmly seated in its socket in the bed plate 55 carried by the truck. The truck and trailer are now ready to proceed to the point of delivery.

Upon arrival at the place where the load is to be delivered, the locking devices 19 will be released, leaving the rollers 14 free to rotate. By means of a hand crank applied to one or more of these rollers, the load will be progressively delivered toward the rear end of the trailer. Before the center of the load passes the trailer axle 1, however, the pin 53 must be removed, thus leaving the frame 6 free to tilt. It will be obvious that as the load moves rearwardly the time will come when the rear roller will bear slightly more than half of its weight. Thereupon the frame 6 will immediately tilt and allow the rear end of the load to contact with the earth. Such portion of the load as remains in contact with the frame of the trailer must necessarily rest equally upon the two rear rollers thereof, and the weight of this portion of the load will consequently be shared by both ends of the springs 3. The rear end of the frame in contact with the ground, will relieve the springs and axle of much of the burden of that portion of the load referred to.

With the load in this position, the driver of the power unit or truck 56 will cause his unit to move slowly ahead, thereby allowing the load to slide rearwardly and downwardly upon the floored portion 20 of the tilted frame 6. The metal plates 21 adjacent the rear roller thereof serve to guide the ends of the sticks comprising the load up onto this roller, and to ease said sticks off of the roller, thereby preventing the gouging of the floor 20. The shoe 22 will slide easily over the surface of the earth and will prevent damage to the rear end of the trailer. It has been found that a load delivered in this manner will reach the ground without any injury whatsoever. In fact, the operation is so gradual as to make any damage to the lumber or other material practically impossible.

It will be noted that the tiltable frame 6 is so balanced above the axle 1 that very little force will be required to cause it to tilt in either direction. The position of the pivot pin 34, relative to the axle, is such that very little vertical movement of the reach 26 will be occasioned by the tilting of frame 6. The forward pull of the truck will tend to restore frame 6 to its normal horizontal position, where it may again be secured, by pin 53, for the return trip. This fact is very important, inasmuch as it makes possible the extended use of a trailer embodying this invention in other fields of industry. It will be clear that the pivotal connection, between the frame unit 24 and the body of the vehicle, is so far radially removed from the vehicle axle about which the body is tiltable that the tractive force of a towing truck may be exercised with considerable moment through the pivot shaft to actually effect the tilting of the trailer body for the purpose of discharging a load therefrom. The load having been discharged, the towing truck could be driven slightly forwardly to restore the tilting body of the trailer to its normal position. For these purposes, it will obviously be necessary to block or otherwise secure the wheels of the trailer against rotation in order to make effective the tractive effort of the towing vehicle in either direction.

It is believed that the foregoing discussion will bring out clearly to those skilled in the art the advantages of the construction herein described over the devices previously designed for the transportation of lumber and like materials. It will be seen that the weight of the lumber will be equally divided between the truck and the trailer while the load is being transported, and between the trailer and the ground during the greater part of the discharging operation. There is at no time a longitudinal strain upon the springs or spring shackles. The whole weight of the load is supported only momentarily by the trailer axle immediately before frame 6 is caused to tilt, and the load at this time is equally distributed between the two ends of the springs and is carried with a minimum of strain upon any part of the device. There is at no time a turning moment exerted upon the springs. As soon as the rearmost roller sustains the majority of the load, the frame 6 automatically tilts to redistribute the weight of the load and the pressure upon the vehicle is immediately relieved.

It is even possible in the use of this trailer to adjust the length after the load is in place to correct an improper distribution of its weight. The appropriate reach locking pin is removed and the rollers adjacent that end of the trailer relative to which the load is to be moved are also unlocked. The towing truck is now driven forwardly or rearwardly as the case may be and the load will move relative to that portion of the trailer upon which the rollers remain unlocked.

I claim:

1. In a trailer, the combination with a supporting axle and wheels, of a trailer frame supported from said axle, a sub-frame pivotally connected to said trailer frame and providing a longitudinal sliding bearing, and a reach having a portion slidably adjustable through said bearing.

2. A trailer including the combination with a supporting axle and wheels, of a trailer frame provided at its forward end with a notched portion and supported from said axle, a sub-frame pivotally connected upon a transverse axis to the trailer frame intermediate the ends thereof and providing a longitudinally elongated sliding bearing, and a single reach member slidably adjustable through the bearing of said sub-frame and provided with a portion adapted to register with the notched portion of the trailer frame.

3. In a trailer, the combination with a supporting axle and wheels, of a trailer frame converging at its forward end and supported from said axle, a sub-frame pivotally connected with an intermediate portion of the trailer frame on a transverse axis, a longitudinally elongated bearing box connected with said sub-frame centrally of said trailer frame, a reach member longitudinally adjustable through said box and extending normally in supporting relation to the converging forward portion of said trailer frame, the adjustable connection between said reach and said sub-frame through said box being sufficiently rigid to enable said reach in any position of adjustment to constitute with said sub-frame a non-yielding support for the forward portions of the trailer frame.

4. A trailer including the combination with a supporting axle and wheels, of a trailer frame supported above said axle and provided with frame members converging forwardly, a Y-shaped sub-frame disposed within the trailer frame with its arms pivoted to the trailer frame upon a common transverse axis, a longitudinally elongated bearing formed in the leg of said Y-shaped sub-frame, and a reach member adjustable in said bearing longitudinally of the trailer frame and disposed normally between the ends of said converging frame members.

5. A trailer provided with an axle and wheels, including a frame supported from said axle, a frame unit pivoted to the frame intermediate of its ends, a second frame unit adapted to be mounted upon a towing vehicle, and a reach adjustable through each of said units.

6. A trailer provided with an axle and wheels, including a frame supported from said axle, a frame unit pivoted to the frame intermediate of its ends, a second frame unit adapted to be mounted upon a towing vehicle, a reach adjustable through each of said units, and means at the forward end of said frame adapted to rest upon an intermediate portion of the reach and to engage the sides thereof.

7. A trailer unit adapted to be detachably mounted on a towing vehicle, said unit comprising a pair of separable members constituting a fifth wheel, a frame supported above one of said members and including forwardly converging side rails, a guideway centrally of said frame connected at its forward end with said converging side rails, a reach slidably adjustable through said guideway and constituting therewith a rigid structure in any position of adjustment, and an eye connected with said converging side rails and adapted to receive supporting tackle at a distance sufficiently in advance of said fifth wheel to avoid interference between such tackle and a load supported on said frame above said wheel.

8. A trailer including the combination with an axle, wheels, and a trailer frame, of a forward frame unit adapted to be supported from a towing vehicle, said unit including a pair of bearing members separably related and constituting a fifth wheel, a frame supported above one of said members and provided with forwardly converging side rails, a bearing device extending the length of said frame and connected at its forward end with said converging side rails, transverse members of said frame being arranged to connect said bearing device adjacent its rear end with remote parts of said side rails, a reach slidably adjustable with reference to said bearing member and connected with said trailer frame, a bolster disposed upon said frame above the axis of said fifth wheel and providing a roller journaled transversely of said unit, and an eye connected with said converging side rails forwardly remote from said roller and adapted to receive supporting tackle forwardly of a load supported on said roller, said bearing device and said reach being adapted to constitute a rigid structure in any position of adjustment, whereby said tackle may support said load.

9. In a trailer, the combination with a supporting axle and wheels, of a trailer frame supported from said axle, a sub-frame pivotally connected with an intermediate portion of the trailer frame on a transverse axis, a longitudinally elongated bearing box connected with said sub-frame centrally of said trailer frame, a reach member longitudinally adjustable through said box and extending normally in supporting relation to the forward portion of said trailer frame, the adjustable connection between said reach and said sub-frame through said box being sufficiently rigid to enable said reach in any position of adjustment to constitute with said sub-frame a non-yielding support for the forward portions of the trailer frame.

10. A trailer including the combination with a supporting axle and wheels, of a trailer frame supported above said axle and provided with frame members, a Y-shaped sub-frame disposed within the trailer frame with its arms pivoted to the trailer frame upon a common transverse axis, a longitudinally elongated bearing formed in the leg of said Y-shaped sub-frame, and a reach member adjustable in said bearing longitudinally of the trailer frame and disposed normally between the ends of said frame members.

CHARLES H. MUELLER.